(12) United States Patent
Kang et al.

(10) Patent No.: US 7,594,190 B2
(45) Date of Patent: Sep. 22, 2009

(54) APPARATUS AND METHOD FOR USER INTERFACING

(75) Inventors: Tae-Young Kang, Uijeongbu-si (KR); Byeong-Cheol Hwang, Seoul (KR); Bong-Hee Kim, Cheonan-si (KR)

(73) Assignee: Samsung Electronics Co., Ltd (KR)

( * ) Notice: Subject to any disclaimer, the term of this patent is extended or adjusted under 35 U.S.C. 154(b) by 316 days.

(21) Appl. No.: 11/248,658

(22) Filed: Oct. 12, 2005

(65) Prior Publication Data
US 2006/0092140 A1 May 4, 2006

(30) Foreign Application Priority Data
Oct. 14, 2004 (KR) .................... 10-2004-0082357

(51) Int. Cl.
G06F 3/00 (2006.01)
G06F 9/00 (2006.01)
G06F 17/00 (2006.01)

(52) U.S. Cl. .................... 715/822; 715/864; 715/821; 715/810; 715/764; 715/711

(58) Field of Classification Search ............. 345/179, 345/157; 715/864, 711, 764, 810, 821, 822
See application file for complete search history.

(56) References Cited

U.S. PATENT DOCUMENTS 5,465,325 A * 11/1995 Capps et al. ................. 345/441
5,513,309 A * 4/1996 Meier et al. ................. 715/860
6,064,387 A * 5/2000 Canaday et al. ............. 715/839
2004/0012572 A1* 1/2004 Sowden et al. .............. 345/173

FOREIGN PATENT DOCUMENTS

KR 10-2001-0010118 2/2001

\* cited by examiner

*Primary Examiner*—Kieu Vu
*Assistant Examiner*—Sabrina Greene
(74) *Attorney, Agent, or Firm*—The Farrell Law Firm, LLP

(57) ABSTRACT

Disclosed are an apparatus and a method for user interfacing. The user interfacing method of a portable terminal with a pointing device includes checking whether or not pointing through the pointing device has occurred, and removing a current image while distorting the current image around a pointing position if pointing has occurred. The user interfacing apparatus of a portable terminal comprises a pointing device for enabling pointing by a user, a display unit for displaying an image for graphic user interfacing, and a control unit for controlling the display unit in such a manner that a current image is removed by distorting the current image around a pointing position and a resultant image according to the pointing is displayed if the pointing has occurred through the pointing device.

14 Claims, 5 Drawing Sheets

APPARATUS AND METHOD FOR USER INTERFACING

PRIORITY

This application claims priority to an application entitled "Apparatus and Method for User Interfacing" filed in the Korean Intellectual Property Office on Oct. 14, 2004 and assigned Serial No. 2004-82357, the contents of which are incorporated herein by reference.

BACKGROUND OF THE INVENTION

1. Field of the Invention

The present invention relates to a portable terminal, and more particularly to an apparatus and method for user interfacing, that enables a user to easily understand an image produced by a user's operation by distorting an image according to the user's operation.

2. Description of the Related Art

Portable terminal functions for a user's convenience are evolving with the development of portable terminal technology. With them, various user interfacing technologies facilitating convenient use of the various portable terminal functions are being developed as well.

For example, Korean Patent Application No. 10-2001-0010118 entitled "Method for Controlling a System Using a Touch Screen" filed in the Korean Intellectual Property Office discloses a technology for a personal mobile communication terminal including a touch screen that enables a user to freely write or input letters or symbols. In addition, the application discloses a technology making it possible to perform functions corresponding to simplified letters or symbols that are previously set, when the simplified letters or symbols are input through the touch screen.

As portable terminal functions are diversified and complicated, it becomes more and more difficult to understand user input by free-hand writing on a touch screen. This phenomenon frequently happens to the middle aged and the prime aged who cannot easily understand a new apparatus or a new function.

Accordingly, development of a technology facilitating understanding of a result according to a user's operation or free-hand user prompt is required.

SUMMARY OF THE INVENTION

Accordingly, the present invention has been made to solve the above-mentioned problems occurring in the prior art, and an object of the present invention is to provide an apparatus and method for user interfacing in a portable terminal, which enable a user to easily understand a result according to a user's operation by removing an image while distorting the image around a pointing position through a pointing device and then by displaying a resultant image according to pointing.

To accomplish the above object, according to an aspect of the present invention, there is provided a user interfacing method of a portable terminal with a pointing device including the steps of checking whether or not pointing through the pointing device has occurred, and removing a current image while distorting the current image around a pointing position if the pointing has occurred.

According to another aspect of the present invention, there is provided a user interfacing apparatus of a portable terminal including a pointing device for enabling pointing by a user, a display unit for displaying an image for graphic user interfacing, and a control unit for controlling the display unit in such a manner that a current image is removed by distorting the current image around a pointing position and a resultant image according to the pointing is displayed if the pointing has occurred through the pointing device.

According to the present invention, a result according to a user's operation can be easily understood by removing an image while distorting the image around a pointing position through a pointing device and displaying a resultant image according to the user's operation.

BRIEF DESCRIPTION OF THE DRAWINGS

The above and other objects, features and advantages of the present invention will be more apparent from the following detailed description taken in conjunction with the accompanying drawings, in which:

FIGS. 4A to 6C illustrate examples of an image displayed according to a preferred embodiment of the present invention.

DETAILED DESCRIPTION OF THE PREFERRED EMBODIMENT

Figure 1:
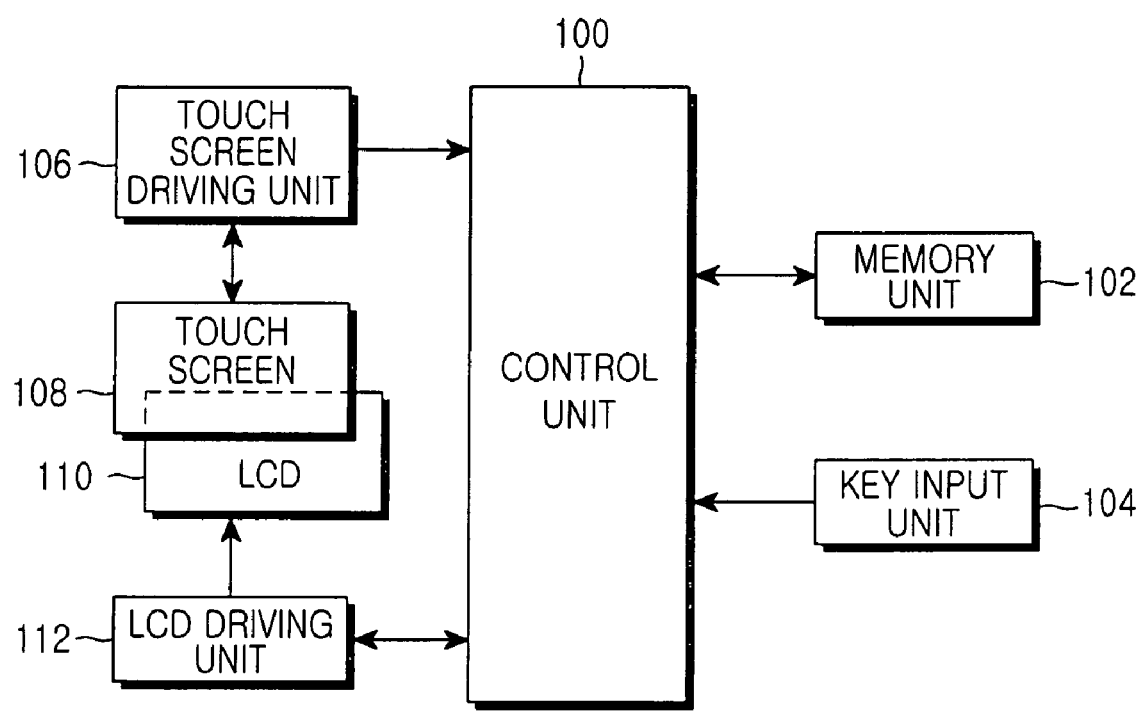
FIG. 1 is a block diagram showing a structure of a portable terminal according to the present invention.

Hereinafter, a preferred embodiment of the present invention will be described in detail with reference to the accompanying drawings. The same or similar components in the drawings are designated by the same reference numerals as far as possible although they are shown in different drawings. In the following description of the present invention, a detailed description of known functions and configurations incorporated herein will be omitted when it may make the subject matter of the present invention unclear.

Hereinafter, a structure of a portable terminal according to the present invention will be schematically described with reference to FIG. 1.

A control unit 100 of the portable terminal controls an overall operation of the portable terminal. Also, according to a preferred embodiment of the present invention, and a user's pointing through a touch screen 108, the control unit 100 removes a current image while dwindling and distorting the current image around a pointing position and creates video data for displaying a resultant image according to the pointing so as to output the video data to an LCD 110 through an LCD driving unit 112. A memory unit 102 stores various data including a control program of the control unit 100.

A key input unit 104 includes a plurality of keys and provides user's operation information through the keys to the control unit 100. A touch screen driving unit 106 provides information according to a user's pointing through the touch screen 108 to the control unit 100 according to the control of the control unit 100. The touch screen 108 is preferably stacked on the LCD 110 and provides information according to the user's pointing to the control unit 100 according to the control of the touch screen driving unit 106. Although the portable terminal uses a touch screen as a pointing device, various pointing devices such as a ball mouse may be employed according to design of the portable terminal.

A user interfacing method for the portable terminal will be described with reference to the flowcharts shown in FIGS. 2 and 3.

Figure 2:
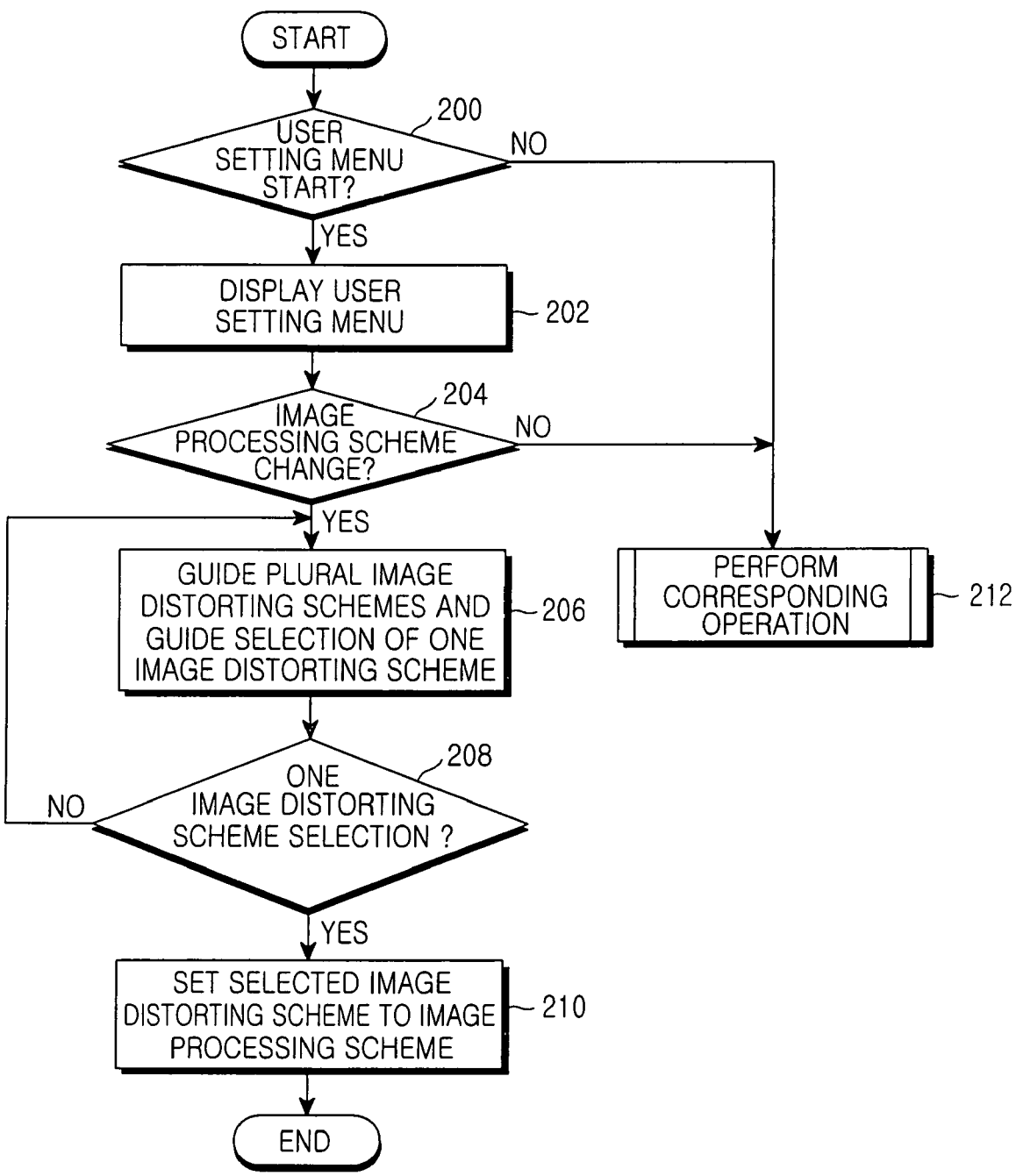
FIGS. 2 and 3 are flowcharts showing a user interfacing method according to a preferred embodiment of the present invention.
Figure 3:
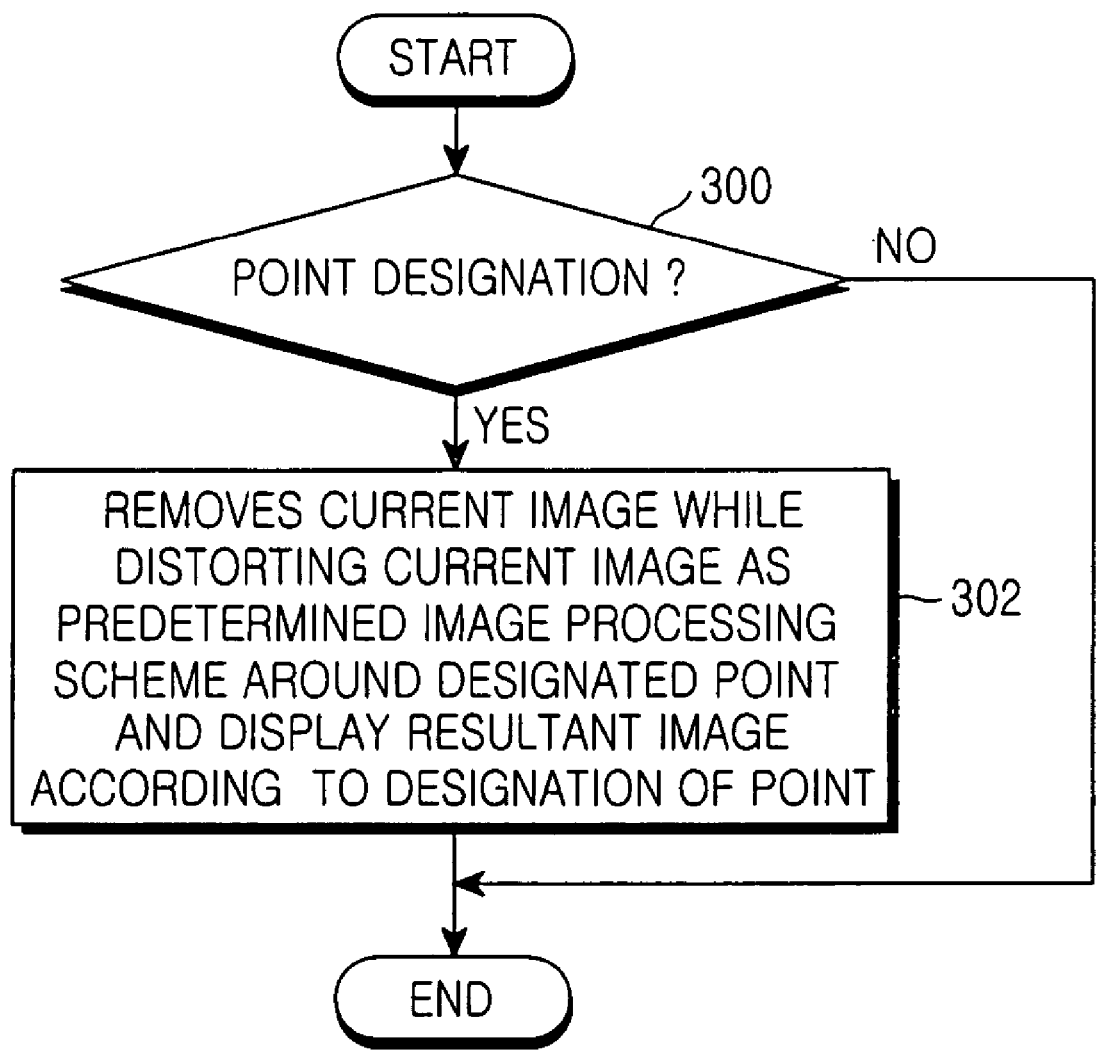
Figure 4:
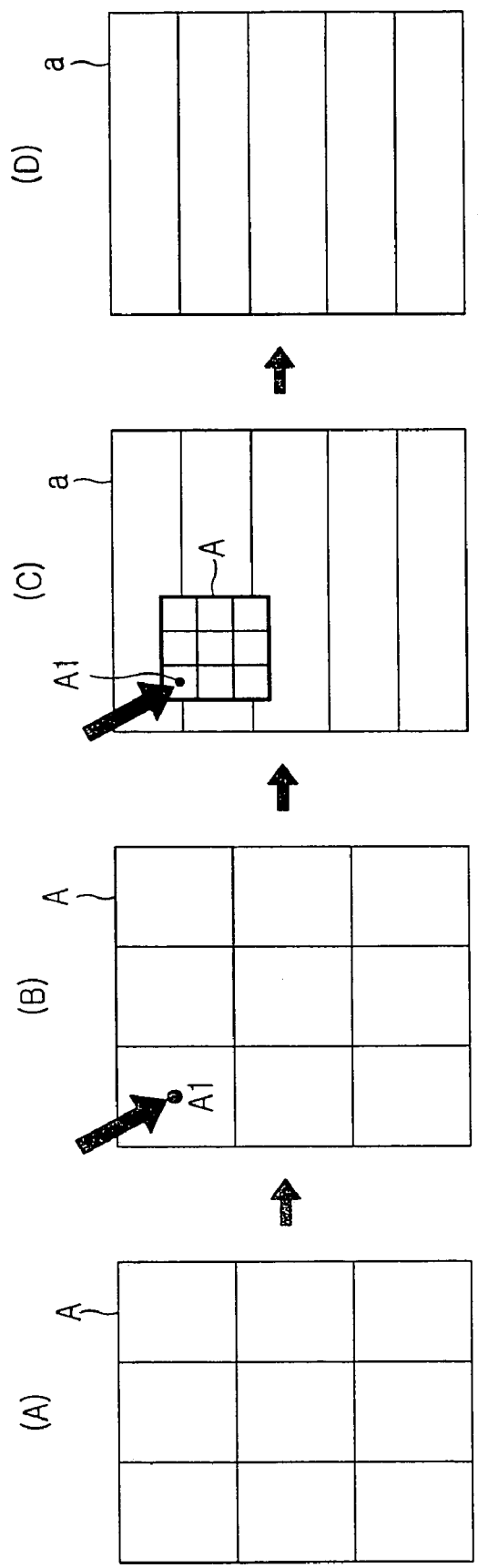
Figure 5:
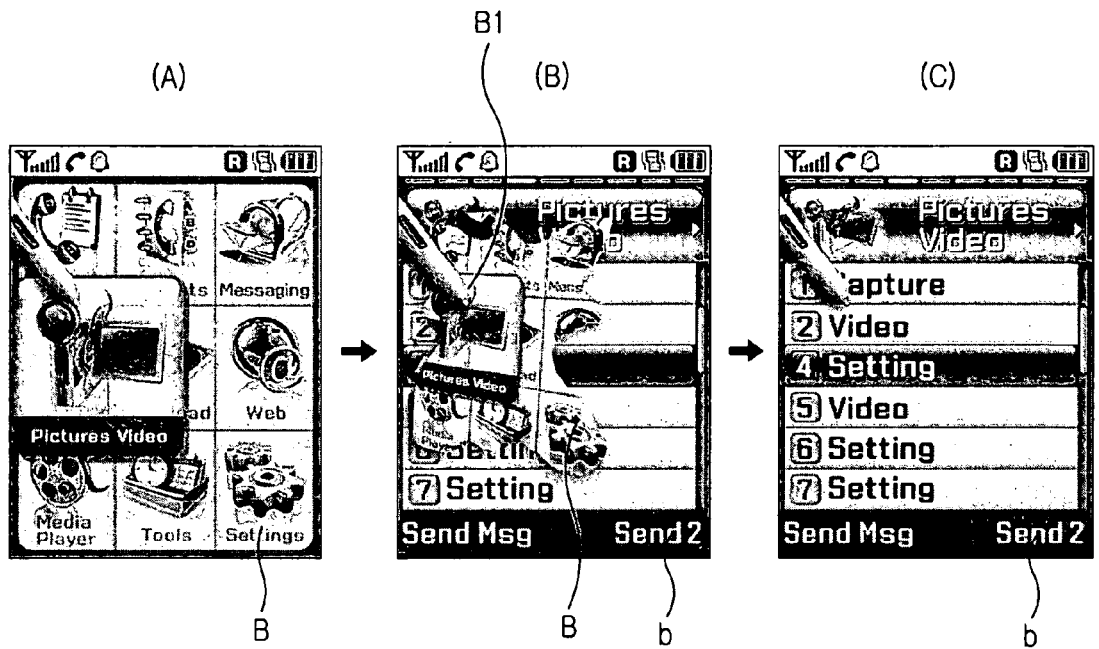
Figure 6:
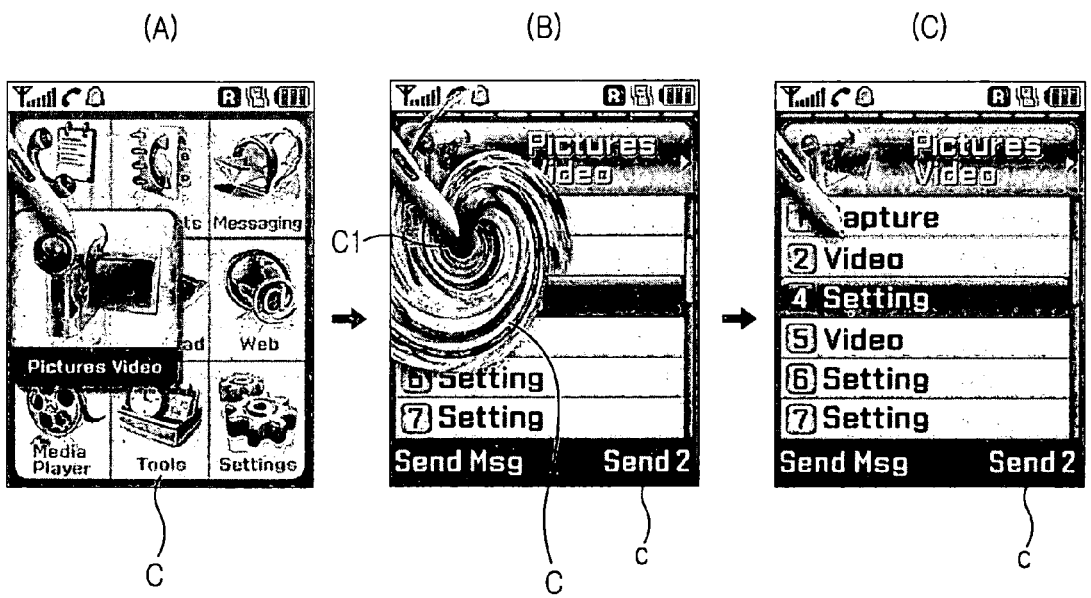

FIG. 2 illustrates a procedure for setting an image distorting scheme according to pointing. The control unit 100 checks whether or not a user instructs the portable terminal to enter into a user setting menu through the key input unit 104 or the touch screen 108 at step 200. If the user has instructed the portable terminal to enter into the user setting menu at step 200, the control unit 100 displays the user setting menu at step 202. The user setting menu includes an item for changing an image distorting scheme.

The control unit 100 checks whether or not the user selects the item for changing an image distorting scheme from the user setting menu through the key input unit 104 or the touch screen 108 at step 204. If the user selects the item for changing an image distorting scheme, the control unit 100 guides a plurality of image distorting schemes and guides the user so that the user may select one of the guided image distorting schemes at step 206.

Hereinafter, the image distorting schemes will be described with examples shown in FIGS. 4A to 6C.

FIGS. 4A to 4D illustrate an image processing procedure according to a first image distorting scheme. FIG. 4A illustrates an original image (A) when there is no user's operation.

If the user points to a predetermined position (A1) of the image (A) shown in FIG. 4B, the control unit 100 removes the image (A) while dwindling the image (A) around the predetermined position (A1) of the image (A) and displays a resultant image (a) according to pointing to the predetermined position (A1) as shown in FIG. 4C. FIG. 4D shows an example of displaying only the resultant image (a) after the original image (A) is entirely removed.

FIGS. 5A to 5C illustrate an image processing procedure according to a second image distorting scheme. FIG. 5B shows an example in which a user points to a predetermined position (B1) of an original image (B) without a user's operation.

If the user points to the predetermined position (B1) as shown in FIG. 5A, the control unit 100 removes the original image (B) around the predetermined position (B1) as water is sucked and drained into the predetermined position (B1), and displays a resultant image according to the pointing to the predetermined position (B1) as shown in FIG. 5B. FIG. 5C shows an example of displaying only the resultant image after the original image (B1) is entirely removed.

FIGS. 6A to 6C illustrate an image processing procedure according to a third image distorting scheme. FIG. 6A shows an example in which a user points to a predetermined position (C1) of an original image (C) without a user's operation.

If the user points to the predetermined position (C1) of the original image (C) as shown in FIG. 6A, the control unit 100 removes the original image (C) around the predetermined position (C1) as water is sucked into the predetermined position (C1) while swirling, and displays a resultant image according to the pointing to the predetermined position (C1) as shown in FIG. 6B. FIG. 6C shows an example of displaying only the resultant image after the original image (B) is entirely removed.

Referring back to FIG. 2, if the user selects one of the plural image distorting schemes as described above at step 208, the control unit 100 sets the selected image distorting scheme as an image processing scheme according to a user's operation at step 210.

Hereinafter, an image processing procedure after the image distorting scheme is set as described above will be described with reference to the flowchart shown in FIG. 3. The control unit 100 checks the position which the user points to on the touch screen 108 at step 300.

If the user points to a predetermined position on the touch screen 108, the control unit 100 removes a current image while dwindling and distorting the current image and displays a resultant image according to the pointing around the selected position according to the predetermined image processing method at step 302.

As described above, according to the present invention, a result according to a user's operation can be easily understood in a portable terminal including various and complex functions by conspicuously showing that the result is obtained through the user's pointing.

As described above, according to the present invention, a result according to a user's operation can be easily understood in a portable terminal including various and complex functions.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A user interfacing method of a portable terminal including a pointing device, the user interfacing method comprising the steps of:

determining whether one of a plurality of predetermined positions on a pre-stored first image displayed on a screen is selected by the pointing device, wherein each of the plurality of predetermined positions corresponds to a different one of a plurality of pre-stored secondary images respectively;

when the predetermined position is selected, making the pre-stored first image disappear in such a manner that the pre-stored first image on the screen is continuously decreased and distorted; and displaying one of the plurality of pre-stored secondary images corresponding to the selected predetermined position.

2. The user interfacing method as claimed in claim 1, wherein the user interface method employs image distorting schemes selectable by a user's requirement.

3. The user interfacing method as claimed in claim 1, wherein the corresponding pre-stored secondary image is displayed while the pre-stored first image disappears by distorting the selected image.

4. The user interfacing method as claimed in claim 3, wherein the corresponding pre-stored secondary image is displayed on a residue area excluding the distorted area of the pre-stored first image while the pre-stored first image disappears by distorting and dwindling the pre-stored first image.

5. The user interfacing method as claimed in claim 4, wherein the pre-stored first image is distorted around a selected point in the pre-stored first image by the pointing device.

6. The user interfacing method as claimed in claim 1, wherein the plurality of secondary images are pre-stored before displaying the pre-stored first image.

7. The user interfacing method as claimed in claim 1, wherein the pre-stored first image is not drawn by the user.

8. A user interfacing apparatus of a portable terminal, the user interfacing apparatus comprising:

a pointing device for enabling selecting and pointing by a user;

a display unit for displaying an image for graphic user interfacing; and a control unit for determining whether one of a plurality of predetermined positions on a pre-stored first image displayed on a screen of the display unit is selected by the pointing device, wherein each of the plurality of predetermined positions corresponds to a different one of a plurality of pre-stored secondary images respectively, and when the predetermined position is selected, controlling the display unit to make the pre-stored first image disappear in such a manner that the pre-stored first image on the screen is continuously decreased and distorted, and to display one of the plurality of pre-stored secondary images corresponding to the selected predetermined position.

9. The user interfacing apparatus as claimed in claim 8, wherein the control unit changes an image distorting scheme according to the user's requirement.

10. The user interfacing apparatus as claimed in claim 8, wherein the corresponding pre-stored secondary image is displayed while the pre-stored first image disappears by distorting the selected image.

11. The user interfacing apparatus as claimed in claim 10, wherein the corresponding pre-stored secondary image is displayed on a residue area excluding the distorted area of the pre-stored first image while the pre-stored first image disappears by distorting and dwindling the pre-stored first image.

12. The user interfacing apparatus as claimed in claim 11, wherein the pre-stored first image is distorted around a selected point in the pre-stored first image by the pointing device.

13. The user interfacing apparatus as claimed in claim 8, wherein the plurality of secondary images are pre-stored before displaying the pre-stored first image.

14. The user interfacing apparatus as claimed in claim 8, wherein the pre-stored first image is not drawn by the user.

* * * * *